United States Patent
Park et al.

(10) Patent No.: US 10,710,351 B2
(45) Date of Patent: Jul. 14, 2020

(54) SYSTEM AND METHOD FOR CONTINUOUSLY MANUFACTURING OPTICAL DISPLAY DEVICE

(71) Applicant: LG CHEM, LTD., Seoul (KR)

(72) Inventors: San Park, Daejeon (KR); Hang Suk Choi, Daejeon (KR); Eung Jin Jang, Daejeon (KR); Suk Jae Lee, Daejeon (KR); Kyung Hyeok Park, Daejeon (KR); Bong Su Jeung, Daejeon (KR); Jea Han Ryoo, Daejeon (KR); Cheon Ho Park, Daejeon (KR); Pil Soo Nam, Daejeon (KR); Beom Seok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 449 days.

(21) Appl. No.: 15/604,970

(22) Filed: May 25, 2017

(65) Prior Publication Data

US 2017/0348957 A1 Dec. 7, 2017

(30) Foreign Application Priority Data

Jun. 3, 2016 (KR) .................. 10-2016-0069653

(51) Int. Cl.
*B32B 38/18* (2006.01)
*B32B 38/10* (2006.01)
(Continued)

(52) U.S. Cl.
CPC .............. *B32B 38/18* (2013.01); *B32B 27/08* (2013.01); *B32B 37/02* (2013.01); *B32B 37/203* (2013.01);
(Continued)

(58) Field of Classification Search
CPC ....... B32B 38/18; B32B 38/10; B32B 37/203; B32B 27/08; B32B 37/02;
(Continued)

(56) References Cited

U.S. PATENT DOCUMENTS

| 2012/0125531 | A1 | 5/2012 | Hirata et al. | |
| 2012/0180947 | A1* | 7/2012 | Hada | B32B 41/00 156/249 |

(Continued)

FOREIGN PATENT DOCUMENTS

| KR | 10-1034111 B1 | 5/2011 |
| KR | 10-2012-0055448 A | 5/2012 |

(Continued)

*Primary Examiner* — Michael N Orlando
*Assistant Examiner* — Cynthia L Schaller
(74) *Attorney, Agent, or Firm* — Dentons US LLP

(57) ABSTRACT

A system for continuously manufacturing an optical display device and methods thereof are described. The system and method include a feeding unit for feeding an optical film, which includes a release film and a plurality of sheet pieces of a polarized film. The system and method further include a peeling unit for peeling the sheet pieces of the polarized film; a winding unit for winding the release film form the sheet pieces of the polarized film; and a controlling unit. The controlling unit controls at least one of the feeding unit, the winding unit, and the laminating unit.

8 Claims, 10 Drawing Sheets

(51) Int. Cl.
  *B32B 27/08* (2006.01)
  *B32B 37/02* (2006.01)
  *B32B 37/20* (2006.01)
  B32B 37/18 (2006.01)
  B32B 38/04 (2006.01)
  G02F 1/13 (2006.01)
  G02F 1/1335 (2006.01)

(52) U.S. Cl.
  CPC ............ *B32B 38/10* (2013.01); *B32B 37/182* (2013.01); *B32B 2038/045* (2013.01); *B32B 2307/42* (2013.01); *B32B 2457/20* (2013.01); *G02F 1/1303* (2013.01); *G02F 1/133528* (2013.01)

(58) Field of Classification Search
  CPC ............ B32B 2038/045; B32B 37/182; B32B 2457/20; B32B 2307/42; G02F 1/133528; G02F 1/1303
  See application file for complete search history.

(56) References Cited

U.S. PATENT DOCUMENTS

2013/0269869 A1\* 10/2013 Hirata .................... B32B 38/10
  156/249
2016/0221321 A1\* 8/2016 Hirata .................... B32B 38/18

FOREIGN PATENT DOCUMENTS

KR  10-1189402 B1  10/2012
KR  10-2013-0116808 A  10/2013

\* cited by examiner

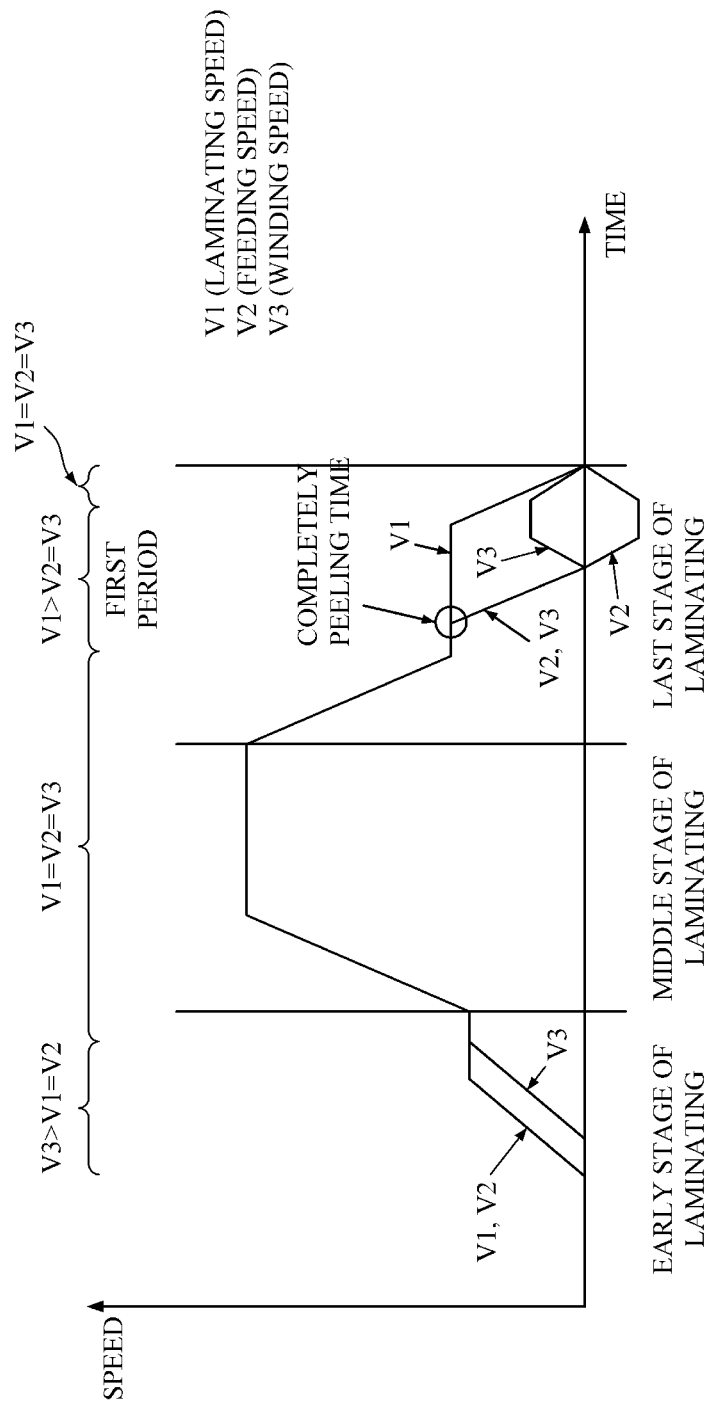

SYSTEM AND METHOD FOR CONTINUOUSLY MANUFACTURING OPTICAL DISPLAY DEVICE

This application claims the priority of KR 10-2016-0069653, filed on Jun. 3, 2016, which is incorporated by reference for all purposes as if fully set forth herein.

TECHNICAL FIELD

The present invention relates to a system and a method for continuously manufacturing an optical display device, and more particularly, to a system and a method for continuously manufacturing an optical display device by laminating a sheet piece of a polarization film peeled from a release film on a panel by an adhesive layer.

BACKGROUND ART

A method for continuously manufacturing an optical display device in the related art is known, in which while a release film in which a sheet piece of a polarization film is formed by an adhesive layer is inwardly folded back to peel the sheet piece of the polarization film from the release film together with the adhesive layer, the sheet piece of the peeled polarization film is laminated to a panel with an attachment unit by the adhesive layer.

According to the method for continuously manufacturing the optical display device in the related art, the release film is inwardly folded back at the front end of a peeling unit to peel the sheet piece of the polarization film from the release film, and the release film from which the sheet piece of the polarization film is peeled is wound and recovered.

In this case, a peeling point is positioned at the front end of the peeling unit, the release film is wound by generating a vibration by friction force between the front end of the peeling unit and the release film, and the sheet piece of the polarization film is also peeled from the release film by generating a vibration by the vibration of the release film. As a result, the sheet piece of the polarization film to be laminated on the panel may be non-uniform, and in the case of laminating the non-uniform sheet piece of the polarization film and the panel by inserting the non-uniform sheet piece of the polarization film and the panel between laminating rolls, a stripe defect (for example, linear bubbles) in the optical display device may be formed.

Meanwhile, in the conventional method for continuously manufacturing the optical display device in the related art, equally controlling a feeding speed of the polarization film and a laminating speed of the sheet piece of the polarization film is generally known. In the conventional method, the sheet pieces of the polarization film, which are adjacent to each other with a slit line, may be reattached and connected to each other by the adhesive layer even after the slit line is formed and a first sheet piece of the polarization film. The polarization film which is being laminated and a second sheet piece of the polarization film to be laminated next may not be completely separated from each other until the first sheet piece of the polarization film is completely laminated on the panel. In this case, there is a problem in that the second sheet piece of the polarization film may be attached to the rear end of the panel on which the first sheet piece of the polarization film is to be laminated while the front end of the polarization film is not separated from the rear end of the first sheet piece of the polarization film.

DETAILED DESCRIPTION OF THE INVENTION

Technical Problem

An object of the present invention is to provide a system for continuously manufacturing an optical display device and a method for continuously manufacturing an optical display device capable of preventing generation of non-uniform defects when a sheet piece of a polarization film is peeled from a release film and separating a first sheet piece of a polarization film and a second sheet piece of a polarization film from each other, before the first sheet piece of the polarization film is completely laminated on a panel.

Technical Solution

The term used herein, "a sheet piece" refers to a piece of a sheet. A sheet piece of a polarization film and is interchangeably used with "a piece of a polarization film sheet".

An exemplary embodiment of the present invention provides a system for continuously manufacturing an optical display device, which includes a feeding unit which transfers and feeds an optical film. The optical film includes a release film which is extended in a longitudinal direction, and a plurality of sheet pieces of a polarization film which are arranged in a longitudinal direction and includes an adhesive layers. The sheet pieces of a polarization film are adhered to the release film through the adhesive layer so that the sheet piece of the polarization film is peeled from the release film. The optical device further includes a peeling unit, which peels the sheet pieces of the polarization film from the release film by folding back inwardly the release film of the optical films fed by the feeding unit; a winding unit, which winds the release film from which the sheet piece of the polarization film is peeled by the peeling unit, a laminating unit, which laminates on the panel the sheet piece of the polarization film peeled from the release film, while transferring the panel; and a control unit, which controls at least one of the feeding unit, the winding unit, and the laminating unit, Control unit may control the feeding unit, the winding unit, or the laminating unit so that the peeling point where the sheet piece of the polarization film is peeled from the release film is formed at a target peeling position spaced apart from the front end of the peeling unit by a predetermined distance toward the laminating unit, and a rear end of a first sheet piece and a front end of a second sheet piece which are connected to each other by adhesion of the adhesive layer are spaced apart from each other between a complete peeling time when the first sheet piece is completely peeled from the release film and a laminating completion time when the first sheet piece is completely laminated. The first piece and the second piece of the polarization film are adjacent to each other with the first sheet piece positioned downstream in a feeding direction.

Further, the control unit may set a first period of at least V2<V1 to be included between the completely peeling time and the laminating completion time, when the laminating speed of the first sheet piece by the lamination unit is V1 and the feeding speed of the optical film in the feeding unit is V2.

A start time of the first period may be the completely peeling time.

The start time of the first period may be a time when a non-laminated area where the adhesive layer of the first sheet piece is exposed is 10 to 30 mm with respect to the entire length of the panel on which the first sheet piece is laminated.

Further, the control unit may control the feeding unit and the winding unit so that V2=V3 for the first period when the winding speed of the release film by the winding unit is V3.

Further, the control unit may control the laminating unit, the feeding unit, and the winding unit to be V3<V1=V2 until the peeling point moves to the target peeling position, when the peeling point is positioned between the front end of the peeling unit and the target peeling position when a laminating speed of the first sheet piece by the laminating unit is V1, a feeding speed of the optical film by the feeding unit is V2, and a winding speed of the release film by the winding unit is V3.

Further, the control unit may control the laminating unit, the feeding unit, and the winding unit to be V3>V1=V2 until the peeling point moves to the target peeling position, when the peeling point is positioned between the target peeling position and the laminating unit when a laminating speed of the first sheet piece by the laminating unit is V1, a feeding speed of the optical film by the feeding unit is V2, and a winding speed of the release film by the winding unit is V3.

Another exemplary embodiment of the present invention provides a method for continuously manufacturing an optical display device, which includes feeding and transferring an optical film. The optical film includes a release film which is extended in a longitudinal direction, and a plurality of sheet pieces of a polarization film which are arranged in a longitudinal direction and include adhesive layers. The sheet pieces of a polarization film is adhered to the release film through the adhesive layer so that the sheet piece of the polarization film is peeled from the release film. The feeding and transferring is conducted by a feeding unit. The method also includes peeling the sheet piece of the polarization film from the release film by folding back inwardly the release film of the optical film fed by the feeding unit, wherein the peeling is conducted by a peeling unit; winding the release film from which the sheet piece of the polarization film is peeled by the peeling unit, wherein the winding is conducted by a winding unit; laminating on the panel the sheet piece of the polarization film peeled from the release film, while transferring the panel, wherein the laminating is conducted by a laminating unit; and controlling at least one of the feeding unit, the winding unit, and the laminating unit the peeling point where the sheet piece of the polarization film is peeled from the release film is formed at a target peeling position spaced apart from the front end of the peeling unit by a predetermined distance toward the laminating unit, and a rear end of a first sheet piece and a front end of a second sheet piece which are connected to each other by adhesion of the adhesive layer. The rear end of the first sheet piece and the front end of the second sheet piece are spaced apart from each other between a complete peeling time when the first sheet piece is completely peeled from the release film. The laminating completion time occurs when the first sheet piece is completely laminated, wherein the first piece and the second piece of the polarization film are adjacent to each other with the first sheet piece positioned downstream in a feeding direction.

Further, in the controlling, a first period of at least V2<V1 may be set to be included between the completely peeling time and the laminating completion time, when the laminating speed of the first sheet piece is V1 in the laminating step and the feeding speed of the optical film is V2 in the feeding step.

A start time of the first period may be the completely peeling time.

The start time of the first period may be a time when a non-laminated area where the adhesive layer of the first sheet piece is exposed is 10 to 30 mm with respect to the entire length of the panel on which the first sheet piece is laminated.

Further, in the controlling, the feeding unit and the winding unit may be controlled so that V2=V3 for the first period when the winding speed of the release film is V3 in the winding step.

In addition, in the controlling, the laminating unit, the feeding unit, and the winding unit may be controlled to be V3<V1=V2 until the peeling point moves to the target peeling position, when the peeling point is positioned between the front end of the peeling unit and the target peeling position when a laminating speed of the first sheet piece in the laminating step is V1, a feeding speed of the optical film in the feeding step is V2, and a winding speed of the release film in the winding step is V3.

Further, in the controlling, the laminating unit, the feeding unit, and the winding unit may be controlled to be V3>V1=V2 until the peeling point moves to the target peeling position, when the peeling point is positioned between the target peeling position and the laminating unit when a laminating speed of the first sheet piece in the laminating step is V1, a feeding speed of the optical film in the feeding step is V2, and a winding speed of the release film in the winding step is V3.

Advantageous Effects

According to the system and the method for continuously manufacturing the optical display device of the present invention, the control unit controls at least one of the feeding unit, the winding unit, and the laminating unit so that the peeling point where the sheet piece of the polarization film is peeled from the release film may be formed at the target peeling position spaced apart from the front end of the peeling unit at a predetermined interval in the laminating unit direction, thereby stably peeling the sheet piece of the polarization film from the release film and suppressing a stripe defect from being formed in the optical display device, as compared with a manufacturing system in the related art in which the release film is wound by generating a vibration by friction force between the front end of the peeling unit and the release film to be wound.

Further, in the system and the method for continuously manufacturing the optical display device of the present invention, the control unit controls at least one of the feeding unit, the winding unit, and the laminating unit, so that a rear end of the first sheet piece and a front end of the second sheet piece connected to each other by adhesion of the adhesive layer are completely separated from each other between a complete peeling time of completely peeling the first sheet piece positioned downstream in a feeding direction of the first sheet pieces and the second sheet piece of two adjacent polarization films from the release film, and a laminating completion time of completely laminating the first sheet piece, thereby preventing the front end of the second sheet piece from being attached to the rear end of the first sheet piece and the rear end of the panel during the laminating process of the first sheet piece.

BRIEF DESCRIPTION OF DRAWINGS

FIG. 6 is a diagram illustrating a condition of speeds V1, V2, and V3 in a system for manufacturing an optical display device according to a second embodiment of the present invention.

EXPLANATION OF REFERENCE NUMERALS AND SYMBOLS

Figure 1:
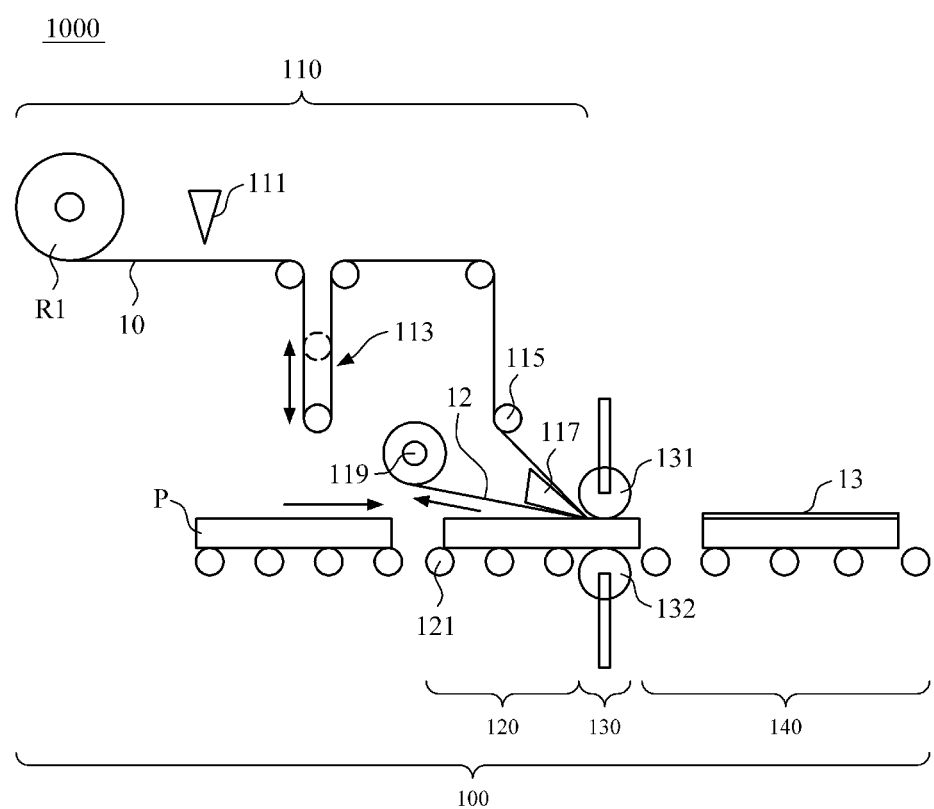
FIG. 1 is a schematic diagram illustrating an example of a system for manufacturing an optical display device according to an exemplary embodiment of the present invention.

1000: System for continuously manufacturing optical display device
100: First film apparatus
110: First release film transfer unit
111: First cutting unit
113: First moving roll
117: First peeling unit
119: First winding unit
120: First panel transfer unit
130: First laminating unit
131: First laminating roller
132: First driving roller
140: Second panel transfer unit
150: Control unit
10: First optical film laminate
11: First polarization film
12: First release film
13: Sheet piece of first polarization film
14: Adhesive layer
P: Panel

BEST MODE

Hereinafter, exemplary embodiments of the present invention will be described so as to be easily implemented by those skilled in the art, with reference to the accompanying drawings. However, the present invention can be realized in various different forms, and is not limited to the exemplary embodiments described herein. In addition, a part not related with a description is omitted in order to clearly describe the present invention and throughout the specification, like reference numerals designate like elements.

Terms used in the present invention adopt general terms which are currently widely used as possible by considering functions in the present invention, but the terms may be understood depending on an intention of those skilled in the art, a precedent, and emergence of new technology. Further, in a specific case, a term which an applicant arbitrarily selects is present and in this case, a meaning of the term will be disclosed in detail in a corresponding description part of the invention. Accordingly, a term used in the present invention should be defined based on not just a name of the term but a meaning of the term and contents throughout the present invention.

A singular form may include a plural form if there is no clearly opposite meaning in the context. Throughout the specification and the claims, unless explicitly described to the contrary, the word "comprise" and variations such as "comprises" or "comprising" will be understood to imply the inclusion of stated elements but not the exclusion of any other elements.

First, an optical film used in the present invention will be described.

The optical film may include a polarization film and a release film. Herein, the optical film may be provided by a film roll wound in a roll shape.

Herein, in the film roll, an optical film laminate may be wound in a roll shape, which includes a polarization film extended in a longitudinal direction and including an adhesive layer; and a release film extended in a longitudinal direction and adhered with the polarization film to be peeled by the adhesive layer. In this case, in the system for continuously manufacturing the optical display device, while the release film is not cut, a cut unit capable of cutting (so-called, half-cutting) the polarization film at a predetermined interval is provided to form a sheet piece of the polarization film from the polarization film. Herein, the cutting of the polarization film may be performed so that a sheet piece of a defect product may be distinguished from a sheet piece of a normal product based on an inspection result of a defect inspection device in the system for continuously manufacturing the optical display device. Herein, in the defect inspection process, the defect on the polarization film may be inspected by emitting light to the polarization film using a light source, imaging transmissive light or reflective light emitted from the polarization film of the emitted light, and processing the image. As the image processing method, for example, a method of detecting a defect by determining a tone by binarization may be used. By using position information of the defect calculated by the defect inspection process, a position of the slit line formed on the polarization film may be determined.

Further, in the film roll, an optical film laminate may be wound in a roll shape wound, which includes a plurality of polarization film sheet pieces which is arranged in a longitudinal direction and includes an adhesive layer; and a release film which is extended in a longitudinal direction and adhered by the adhesive layer so that the sheet piece of the polarization film can be peeled. In other words, the film roll may be a continuous roll of the polarization film with the slit line.

For example, in a first film roll R1 illustrated in FIG. 1, a first optical film laminate 10 is wound in a roll shape, which includes a first polarization film 11 including a first adhesive layer and a release film 12 adhered to the first polarization film 11 by the first adhesive layer.

The polarization film may generally include a polarizer, and a protective film formed on one surface or two surfaces of the polarizer by a bonding agent or an adhesive.

The first optical film laminate 10 may further include a retardation film, a visual compensation film, a brightness enhancement film, and a surface protection film. The adhesive layer which is a medium of the polarization film and the release film may use an acrylic adhesive, a silicone adhesive, a urethane adhesive, and the like, but is not necessarily limited thereto.

The release film may use a plastic film and the like and may be coated with a peeling agent such as silicone, long-chain alkyl, fluorine, and molybdenum sulfide, but is not necessarily limited thereto.

Next, the optical display device which is manufactured by the system for continuously manufacturing the optical display device according to the present invention will be described.

The optical display device is to laminate the sheet piece of the polarizing film on one side or both sides of the panel, and a driving circuit may be embedded if necessary. Herein, the panel is a liquid crystal panel including a liquid crystal cell and may be classified into types including a VA type, an IPS type, and the like. A panel P illustrated in FIG. 1 may be a configuration in which a liquid crystal cell layer is disposed between a pair of substrates in a sealed state.

Figure 2A:
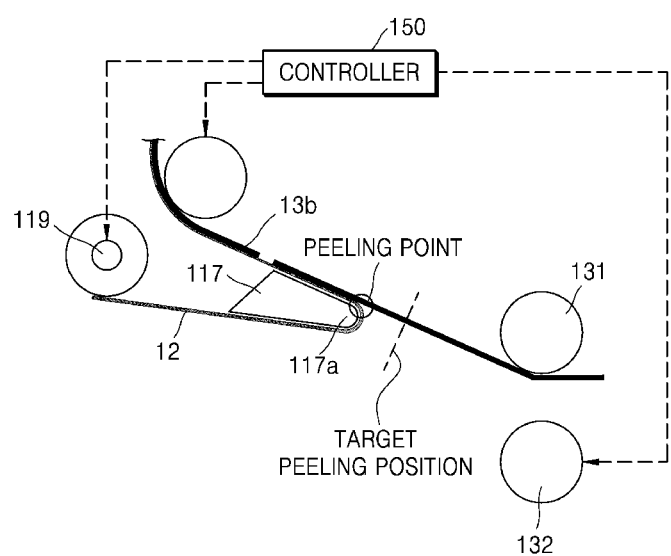
FIGS. 2A and 2B are schematic diagrams for describing a method of advancing a peeling point in the system for manufacturing the optical display device according to the exemplary embodiment of the present invention.
Figure 2B:
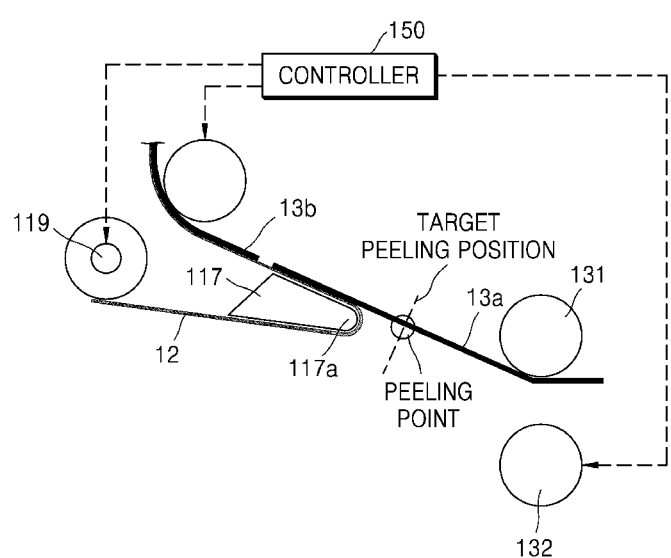
Figure 3A:
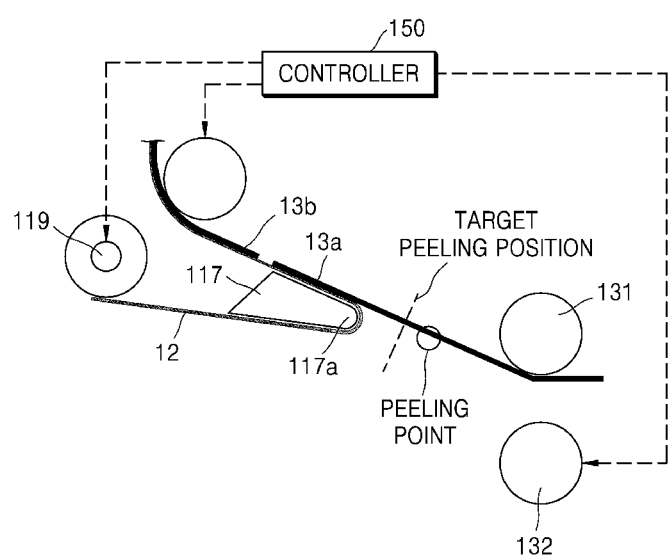
FIGS. 3A and 3B are schematic diagrams for describing a method of reversing a peeling point in the system for manufacturing the optical display device according to the exemplary embodiment of the present invention.
Figure 3B:
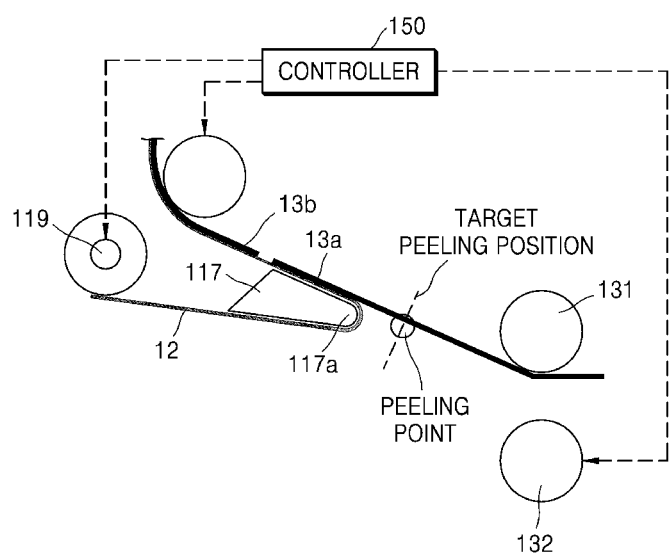
Figure 4A:
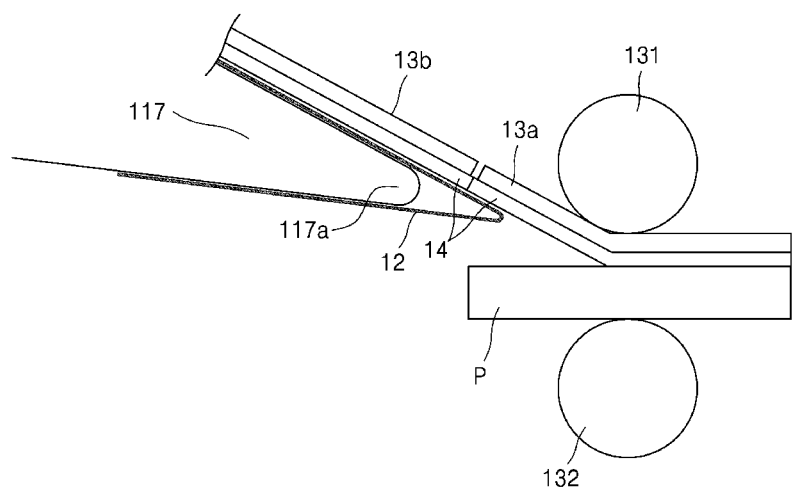
FIGS. 4A and 4B are schematic diagrams for describing a method of separating a first polarization film sheet piece and a second polarization film sheet piece by using a control of a laminating speed V1, a feeding speed V2 and a winding speed V3 in the system for manufacturing the optical display device according to the exemplary embodiment of the present invention.
Figure 4B:
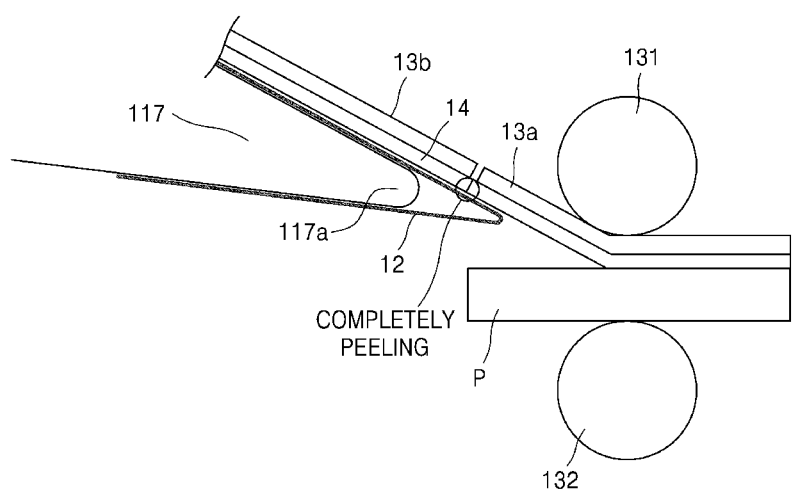

FIG. 1 is a schematic diagram illustrating an example of a system for manufacturing an optical display device according to an exemplary embodiment of the present invention, FIGS. 2A and 2B are schematic diagrams for describing a method of advancing a peeling point in the system for manufacturing the optical display device according to the exemplary embodiment of the present invention, FIGS. 3A and 3B are schematic diagrams for describing a method of reversing a peeling point in the system for manufacturing the optical display device according to the exemplary embodiment of the present invention, and FIGS. 4A and 4B are schematic diagrams for describing a method of separating a first polarization film sheet piece and a second polarization film sheet piece by using a control of a laminating speed V1, a feeding speed V2 and a winding speed V3 in the system for manufacturing the optical display device according to the exemplary embodiment of the present invention.

The system for continuously manufacturing the optical display device according to the embodiment of the present invention may include a feeding unit which transfers and feeds the optical film including a plurality of polarization film sheet pieces which is arranged in a longitudinal direction and includes an adhesive layer and a release film which is extended in a longitudinal direction and adhered using an adhesive layer so that the sheet piece of the polarization film can be peeled; a peeling unit which peels the sheet pieces of the polarization film from the release film by folding back inwardly the release film among the optical films fed by the feeding unit; a winding unit which winds the release film from which the sheet piece of the polarization film is peeled by the peeling unit; and a laminating unit which laminates the sheet piece of the polarization film peeled from the release film on the panel while transferring the panel. In addition, in the peeling process of peeling the sheet piece of the polarization film from the release film and the laminating process of laminating the sheet piece of the polarization film, the system may include a control unit which controls at least one of the feeding unit, the winding unit, and the laminating unit so that the peeling point where the sheet piece of the polarization film is peeled from the release film may be formed at a target peeling position spaced apart from the front end of the peeling unit by a predetermined distance in a direction of the laminating unit, and a rear end of the first sheet piece of the polarization film and a front end of the second sheet piece of the polarization film connected to each other by adhesion of the adhesive layer are completely separated to be spaced apart from each other between a completely peeling time of completely peeling the first sheet piece of the polarization film positioned downstream in a feeding direction of the first sheet pieces and the second sheet piece of two adjacent polarization films from the release film, and a laminating completion time of completely laminating the first sheet piece of the polarization film. Further, the control unit may set a first period of at least V2<V1 to be included between the completely peeling time and the laminating completion time, when the laminating speed of the first polarization film sheet piece by the lamination unit is V1 and the feeding speed of the optical film in the feeding unit is V2.

Hereinafter, the system for continuously manufacturing the optical display device and the method for continuously manufacturing the optical display device according to the exemplary embodiment of the present invention will be described in detail with reference to FIGS. 1 to 4.

A system 1000 for continuously manufacturing the optical display device may include a first film apparatus 100 laminating the sheet piece of the polarization film on one surface of the panel P and a second film apparatus (not illustrated) laminating the sheet piece of the polarization film on the other surface of the panel P.

The first film apparatus 100 may include a first release film transfer unit 110, a first panel transfer unit 120, a first laminating unit 130, and a second panel transfer unit 140.

The second film apparatus (not illustrated) may include the same unit elements as the unit elements configuring the first film apparatus 100. In detail, the second film apparatus may include a second release film transfer unit, a second laminating unit, and an optical display device transfer unit.

The exemplary embodiment of the present invention related with the laminating position of the sheet piece of the polarization film is configured to (a) laminate the sheet piece of the polarization film on one surface of the panel above the panel, reverses the panel laminated with the sheet piece of the polarization film so that directions which one surface and the other surface face may be reversed to each other, and then laminate the sheet piece of the polarization film on the other surface of the panel above the panel. However, the exemplary embodiment of the present invention is not limited thereto, and may (b) laminate the sheet piece of the polarizing film on one surface of the panel below the panel, reverse the panel, and then laminate the sheet piece of the polarization film on the other surface of the panel below the panel, (c) laminate the sheet piece of the polarization film on one surface of the panel above the panel, not reverse the panel, and then laminate the sheet piece of the polarization film on the other surface of the panel below the panel, and (d) laminate the sheet piece of the polarizing film on one surface of the panel below the panel, not reverse the panel, and then laminate the sheet piece of the polarization film on the other surface of the panel above the panel.

The first panel transfer unit 120 may transfer the panel P to the first laminating unit 130. Herein, the first panel transfer unit 120 may include various transfer means and for example, may transfer the panel P to the downstream of the manufacturing line by using a transfer roller 121 or a conveyor belt.

The first release film transfer unit 110 unwinds the first optical film laminate 10 from the first film roll R1, cuts the first polarization film 11 to a depth which does not reach the first release film 12 at a predetermined interval to form sheet pieces 13a and 13b of the first polarization film 11, feeds the sheet pieces 13a and 13b of the first polarization film 11 together with the first release film 12 to transfer the sheet pieces 13a and 13b of the first polarization film 11 to the first laminating unit 130, and folds back inwardly the first release film 12 to peel the sheet pieces 13a and 13b of the first polarization film 11 from the first release film 12 together with an adhesive layer 14 to supply the peeled sheet pieces 13a and 13b of the first polarization film 11 to the first laminating unit 130. In the embodiment, the first release film transfer unit 110 may include a first cut unit 111, a first moving roll 113, a first feeding unit 115, a first peeling unit 117, and a first winding unit 119.

The first cut unit 111 cuts the first polarization film 11 together with the adhesive layer 14 up to a depth which does not reach the first release film 12 at a predetermined interval while fixing a first optical film laminate 10 from the first release film 12 side by an adsorption device 111a to form the sheet pieces 13a and 13b of the first polarization film 11 on the first release film 12. In the embodiment, the first cut unit 111 may use a circular blade, a laser device, and the like.

The first moving roll 113 absorbs a tension variation of the first release film 12 to maintain the tension of the first release film 12.

The first feeding unit 115 includes a first feeding roller 115 to transfer the first optical film laminate 10. A feeding speed V2 of the first optical film laminate 10 by the first feeding unit 115 may be controlled by a first control unit 150 to be described below.

The first release film transfer unit 110 transfers the first release film 12 through the first moving roll 113 and the first feeding unit 115.

In the case of laminating the sheet piece 13a of the first polarization film 11 on the panel P, the first peeling unit 117 may peel the sheet pieces 13a and 13b of the first polarization film 11 from the first release film 12 together with the adhesive layer 14, by folding back inwardly the first release film 12 of the first optical film laminate 10 fed from the first feeding unit 115 at the front end 117a thereof. In the embodiment, the first peeling unit 117 provides a front end 117a as a knife edge portion, but is not necessarily limited thereto. A radius of curvature of the knife edge portion may be 0.3 to 5.0 mm.

The first winding unit 119 may wind the first release film 12 from which the sheet pieces 13a and 13b of the first polarization film 11 are peeled by the first peeling unit 117. A winding speed V3 of the first release film 12 by the first winding unit 119 may be controlled by a first control unit 150 to be described below.

The first laminating unit 130 may laminate the sheet piece 13 of the first polarization film 11 supplied by the first release film transfer unit 110 by the adhesive layer 14 above the panel P supplied by the first panel transfer unit 120. In the embodiment, the first laminating unit 130 may include a first laminating roller 131 and a first driving roller 132. Herein, the sheet piece of the first polarization film 11 which is being laminated on the panel P by the first laminating unit 130 will be described as the first sheet piece 13a and the sheet piece of the first polarization film 11 to be laminated next to the first sheet piece 13a will be described as the second sheet piece 13b. A laminating speed V1 of the first sheet piece 13a by the first laminating unit 130 may be controlled by a first control unit 150 to be described below. For example, by the first control unit 150 to be described below, the rotation speed of the first driving roller 132 is controlled to control the laminating speed V1. Meanwhile, the first laminating roller 131 may be a member driven by driving the first driving roller 132, but is not necessarily limited thereto and driving and driven may have a reverse relationship, and the first laminating roller 131 may be a member capable of driving both the first laminating roller 131 and the first driving roller 132.

The first control unit 150 controls the first driving roller 132, the first feeding roller 115 and the first winding unit 119 to control the laminating speed V1 of the first sheet piece 13a (the transfer speed of the first sheet piece 13a and the panel), the feeding speed V2 of the first optical film laminate 10 (the transfer speed of the second sheet piece 13b), and the winding speed V3 of the first release film 12 (the transfer speed of the first release film 12 from which the sheet piece is peeled).

The first control unit 150 controls a rotating speed of the first driving roller 132 to control the laminating speed V1 of the first sheet piece 13a (the transfer speed of the first sheet piece 13a and the panel P). Further, the first control unit 150 may control a rotating speed of the first feeding roller 115 to control the feeding speed V2 of the first optical film laminate 10 (the transfer speed of the second sheet piece 13b). In addition, the first control unit 150 may control the first winding unit 119 to control the winding speed V3 of the first release film 12 (the transfer speed of the first release film 12 from which the sheet piece is peeled).

The first control unit 150 may control the first driving roller 132, the first feeding roller 115 and the first winding unit 119 so that the peeling point where the sheet piece of the first polarization film is peeled from the first release film 12 may be formed at a target peeling position spaced apart from the front end 117a of the first peeling unit 117 by a predetermined distance in the direction toward the first laminating unit 130.

Herein, the target peeling position may be determined according to the operator's selection as a position between the front end 117a of the first peeling unit 117 and the first laminating roller 131.

Preferably, the target peeling position may be, for example, a point of 3 to 15 mm spaced apart from the front end 117a of the first peeling unit 117. When the target peeling position is within 3 mm from the front end 117a of the first peeling unit 117, the front end 117a of the first peeling unit 117 and the first release film 12 portion folded back inward are not sufficiently separated from each other, and thus there is a problem in that the first release film 12 is wound by vibrating due to friction force between the front end 117a of the peeling unit 117 and the first release film 12 portion folded back inward. Further, when the target peeling position is a point which is spaced apart from the front end 117a of the first peeling unit 117 by more than 15 mm, there may be a problem in that the front end of the sheet piece of the first polarization film which is being fed is not sufficiently supported from one side of the front end of the first peeling unit 117 to be sagged.

For example, as illustrated in FIG. 2A, when the peeling point is positioned between the front end 117a of the first peeling unit 117 and the target peeling position, the first control unit 150 may control the first driving roller 132, the first feeding roller 115 and the first winding unit 119 to be V3<V1=V2 until the peeling point moves to the target peeling position. Herein, V1 is the laminating speed of the first sheet piece 13a and also the transfer speed of the first sheet piece 13a and the panel P, V2 is the feeding speed of the first optical film laminate 10 and also the transfer speed of the second sheet piece 13b, and V3 is the winding speed of the first release film 12 and also the transfer speed of the first release film 12 from which the sheet piece is peeled. When V1 and V2 are equally controlled, the first sheet piece 13a and the second sheet piece 13b which are adjacent to each other and has the slit line formed therebetween are connected to each other by adhesion of the adhesive layer 14, and thus the first sheet piece 13a and the second sheet piece 13b are transferred without separation. However, when V3 is controlled to be smaller than V1 and V2, the first release film 12 portion from which the sheet piece is peeled is wound at a speed slower than the transfer speed of the first sheet piece 13a and the second sheet piece 13b, and the transfer speed of the first release film 12 portion from which the sheet piece is not peeled follows the transfer speeds V1 and V2 of the sheet piece, and as a result, the peeling point is gradually advanced to the downstream of the manufacturing line. In addition, as illustrated in FIG. 2B, when the peeling position reaches the target peeling position, the first control unit 150 controls the first driving roller 132, the first feeding roller 115 and the first winding unit 119 to be V1=V2=V3 and thus may continuously position the peeling point on the target peeling position.

As another example, as illustrated in FIG. 3A, when the peeling point is positioned between the target peeling position and the laminating unit, the first control unit 150 may control the first driving roller 132, the first feeding roller 115 and the first winding unit 119 to be V3<V1=V2 until the peeling point moves to the target peeling position. When V1 and V2 are equally controlled, the first sheet piece 13a and the second sheet piece 13b which are adjacent to each other and have the slit line formed therebetween are connected to each other by adhesion of the adhesive layer 14, and thus the first sheet piece 13a and the second sheet piece 13b are transferred without separation. However, when V3 is controlled to be larger than V1 and V2, the first release film 12 portion from which the sheet piece is peeled is wound at a speed faster than the transfer speed of the first sheet piece 13a and the second sheet piece 13b, and the transfer speed of the first release film 12 portion from which the sheet piece is not peeled follows the transfer speeds V1 and V2 of the sheet piece, and as a result, the peeling point is gradually reversed to the downstream of the manufacturing line. In addition, as illustrated in FIG. 3B, when the peeling position reaches the target peeling position, the first control unit controls the first driving roller 132, the first feeding roller 115 and the first winding unit 119 to be V1=V2=V3 and thus may continuously position the peeling point on the target peeling position.

Further, the first control unit 150 may control the first driving roller 132, the first feeding roller 115 and the first winding unit 119 so that a rear end of the first sheet piece 13a of the first polarization film 11 and a front end of the second sheet piece 13b of the first polarization film 11 connected to each other by adhesion of the adhesive layer are completely separated to be spaced apart from each other between the completely peeling time of completely peeling the first sheet piece 13a of the first polarization film 11 positioned at the downstream side in the feeding direction of the first sheet piece 13a of the first polarization film 11 and the second sheet piece 13b of the first polarization film 11 which are adjacent to each other from the first release film 12, and a laminating completion time of completely laminating the first sheet piece 13a of the first polarization film 11. Herein, the first control unit 150 may set a first period of at least V2<V1 to be included between the completely peeling time of completely peeling the first sheet piece 13a from the first release film 12 while the first sheet piece 13a is laminated and the laminating completion time of completely laminating the first sheet piece 13a.

For example, a start time of the first period may be the completely peeling time. When the first control unit 150 sets the start time of the first period as the completely peeling time, the feeding speed V2 of the first optical film laminate 10 (the transfer speed of the second sheet piece 13b) at the completely peeling time is smaller than the laminating speed V1 of the first sheet piece 13a (the transfer speed of the first sheet piece 13a and the panel P), and thus while the first sheet piece 13a is not influenced by the winding speed V3 of the first release film 12, the rear end of the first sheet piece 13a and the front end of the second sheet piece 13b connected by the adhesion of the adhesive layer 14 may be spaced apart and completely separated from each other. Further, since the first sheet piece 13a and the panel P move faster than transfer speed of the second sheet piece 13b for the first period, the front end of the second sheet piece 13b may not be attached to the rear end of the first sheet piece 13a and the rear end of the panel P.

As another example, the start time of the first period may be a time when an non-laminating length which is not yet laminated is 10 to 30 mm with respect to the entire length of the panel P on which the first sheet piece 13a of the first polarization film 11 is laminated. When the first control unit 150 sets the start time of the first period as the time when the non-laminating length is 10 to mm, the feeding speed V2 of the first optical film laminate 10 (the transfer speed of the second sheet piece 13b) is smaller than the laminating speed V1 of the first sheet piece 13a (the transfer speed of the first sheet piece 13a and the panel P) at the time when the non-laminating length is 10 to 30 mm, and thus while an area where the adhesive layer 14 of the first sheet piece 13a is exposed at the start time of the first period is 10 to 30 mm, the rear end of the first sheet piece 13a and the front end of the second sheet piece 13b connected by the adhesion of the adhesive layer 14 may be completely separated while being spaced apart from each other. Herein, the area where the adhesive layer 14 of the first sheet piece 13a is exposed is gradually decreased from the start time of the first period to the laminating completion time. In other words, the area where the adhesive layer 14 of the first sheet piece 13a is exposed is decreased to 10 to 30 mm at the start time of the first period to efficiently suppress a possibility that foreign materials may be introduced to the adhesive layer 14 of the first sheet piece 13a. However, referring to FIGS. 4A and 4B, in the embodiment, the first control unit 150 controls the first driving roller 132, the first feeding roller 115 and the first winding unit 119 to be V1=V2=V3 until the completely peeling time of completely peeling the first sheet piece 13a from the release film 12 while the first sheet piece 13a is laminated on the panel P to maintain the peeling point on the target peeling position. Further, the first control unit 150 controls the first driving roller 132, the first feeding roller 115 and the first winding unit 119 to be V1>V2=V3 for the first period by setting the completely peeling time as the start time of the first period to laminate the first sheet piece 13a on the panel P while the rear end of the first sheet piece 13a and the front end of the second sheet piece 13b connected by the adhesion of the adhesive layer 14 may be completely separated while being spaced apart from each other and simultaneously maintain the peeling point on the target peeling position. The start time of the first period may be a time when the non-laminating length is 10 to 30 mm as well as the complete peeling time. Herein, the first control unit 150 may control the first driving roller 132, the first feeding roller 115 and the first winding unit 119 to decrease the laminating speed V1, the first feeding speed V2, and the winding speed V3 while maintaining the speeds at the same speed before the first period time of V1>V2=V3 and to be V1>V2=V3 for the first period. As a result, by laminating, feeding, and peeling at a low speed, while the peeling point is maintained on the target peeling position, laminating, feeding, and peeling are more stabilized and thus defect rate of the optical display device due to introduction of bubbles and foreign materials and generation of stripes may be decreased.

The second panel transfer unit 140 transfers the panel P laminated with the first sheet piece 13$a$ by the first laminating unit 130 to supply the panel P to the second laminating unit. The second panel transfer unit 140 may include a pivoting device capable of rotating the panel P on which the first sheet piece 13$a$ is laminated at 90° so that the positional relationship between the long side and the short side of the panel P may be reversed to each other while maintaining the panel P in a horizontal state and a reversing device of reversing the panel P on which the first sheet piece 13$a$ is laminated so that the positional relationship between one surface and the other surface of the panel P may be reversed to each other.

The system for continuously manufacturing the optical display device may include a second film apparatus (not illustrated) laminating the sheet piece of the polarization film on the other surface of the panel P as described above. The second film apparatus may use elements such as respective units and devices described in the first film apparatus 100. For example, a second release film transfer unit may be configured by the same device as the first release film transfer unit 120, a second feeding unit may configured by the same device as the first feeding unit 115, a second laminating unit may be configured by the same device as the first laminating unit 130, and a second control unit may be configured to perform the same function as the first control unit 150.

The system for continuously manufacturing the optical display device may include an optical display device transfer unit (not illustrated) capable of transferring the optical display device laminated with the polarization film on the other surface of the panel by the second laminating unit to the downstream side of the manufacturing line. Herein, the optical display device transfer unit (not illustrated) may use a transfer roller or a conveyor belt.

The system for continuously manufacturing the optical display device may include an inspection unit for inspecting the optical display device. Herein, an inspection object and an inspection method of the inspection unit are not particularly limited.

A method for continuously manufacturing an optical display device according to another embodiment of the present invention, which includes a feeding step of transferring and feeding, by a feeding unit, an optical film including a plurality of sheet pieces of a polarization film which is arranged in a longitudinal direction and includes an adhesive layer and a release film which is extended in a longitudinal direction and adhered by the adhesive layer so that the sheet piece of the polarization film can be peeled; a peeling step of peeling, by a peeling unit, the sheet piece of the polarization film from the release film by folding back inwardly the release film of the optical film fed by the feeding unit; a winding step of winding, by a winding unit, the release film from which the sheet piece of the polarization film is peeled by the peeling unit; and includes a laminating step of laminating, by a laminating unit, the sheet piece of the polarization film peeled from the release film on the panel while transferring the panel, may include a control step of controlling at least one of the feeding unit, the winding unit, and the laminating unit so that the peeling point where the sheet piece of the polarization film is peeled from the release film may be formed at a target peeling position spaced apart from the front end of the peeling unit by a predetermined distance in a direction of the laminating unit, and a rear end of the first sheet piece and a front end of the second sheet piece connected to each other by adhesion of the adhesive layer are completely separated to be spaced apart from each other between a completely peeling time of completely peeling the first sheet piece positioned downstream in a feeding direction of the first sheet pieces and the second sheet piece of two adjacent polarization films from the release film, and a laminating completion time of completely laminating the first sheet piece.

In a first laminating process of laminating the sheet piece of the first polarization film 11 on one surface of the panel, in the embodiment, a first optical film laminate is unwound from a first film roll wound in a roll shape with the first optical film laminate including a first polarization film 11 extended in a longitudinal direction and including an adhesive layer and a first release film 12 adhered by the adhesive layer 14 so that the first polarization film 11 can be peeled. In addition, the sheet piece of the first polarization film 11 is formed on the first release film 12 by cutting the first polarization film 11 including the adhesive layer 14 without cutting the first release film 12. Thereafter, the sheet piece of the first polarization film 11 is peeled from the first release film 12 together with the adhesive layer 14 by folding back inwardly and transferring the first release film 12 at a target peeling position spaced apart from the front end of the first peeling unit at a predetermined interval. In addition, the first sheet piece 13$a$ of the first polarization film 11 is laminated on one surface of the panel P by the adhesive layer 14.

In the first control step, the first feeding unit 115, the first laminating unit 130, and the first winding unit 119 may be controlled so that the peeling point where the sheet piece of the polarization film 11 is peeled from the release film 12 may be formed at a target peeling position spaced apart from the front end of the peeling unit by a predetermined distance in a direction of the laminating unit.

For example, as illustrated in FIG. 2A, when the peeling point is positioned between the front end of the first peeling unit and the target peeling position, in the first control step, the first driving roller 132, the first feeding roller 115 and the first winding unit 119 may be controlled to be V3<V1=V2 until the peeling point moves to the target peeling position.

As another example, as illustrated in FIG. 3A, when the peeling point is positioned between the target peeling position and the laminating unit, in the first control step, the first driving roller 132, the first feeding roller 115 and the first winding unit 119 may be controlled to be V3>V1=V2 until the peeling point moves to the target peeling position.

Further, in the first control step, the first driving roller 132, the first feeding roller 115 and the first winding unit 119 may be controlled so that the first sheet piece 13$a$ of the first polarization film 11 and the second sheet piece 13$b$ of the first polarization film 11 may be completely separated from each other between the completely peeling time of completely peeling the first sheet piece 13$a$ of the first polarization film 11 positioned at the downstream side in the feeding direction of the first sheet piece 13$a$ of the first polarization film 11 and the second sheet piece 13$b$ of the first polarization film 2 which are adjacent to each other from the first release film 12, and a laminating completion time of completely laminating the first sheet piece 13$a$ of the first polarization film 11.

Herein, in the first control step, a first period of at least V2<V1 may be set to be included between the completely peeling time of completely peeling the first sheet piece 13$a$ from the first release film 12 while the first sheet piece 13$a$ is laminated and the laminating completion time of completely laminating the first sheet piece 13a.

For example, the start time of the first period may be at least one of the completely peeling time and a time when a non-laminating length which is not yet laminated is 10 to 30 mm with respect to the entire length of the panel P on which the first sheet piece 13a of the first polarization film 11 is laminated.

The method for continuously manufacturing the optical display device according to the embodiment may include a step of pivoting and reversing the panel P in the case of laminating the polarization film on the other surface of the panel P. The pivoting and reversing step may correspond to a pivoting process of maintaining the panel P on which first polarization film 11 is laminated in a horizontal state and reversing a positional relationship between the long side and the short side of the panel P; and a reversing process of reversing a positional relationship between one surface and the other surface of the panel P.

A second laminating process of laminating a second polarization film sheet piece on the other surface of the panel P is performed the same as the first laminating process of laminating the sheet piece of the first polarization film 11 on one surface of the panel P and a second control step may be performed the same as the first control step.

Figure 5A:
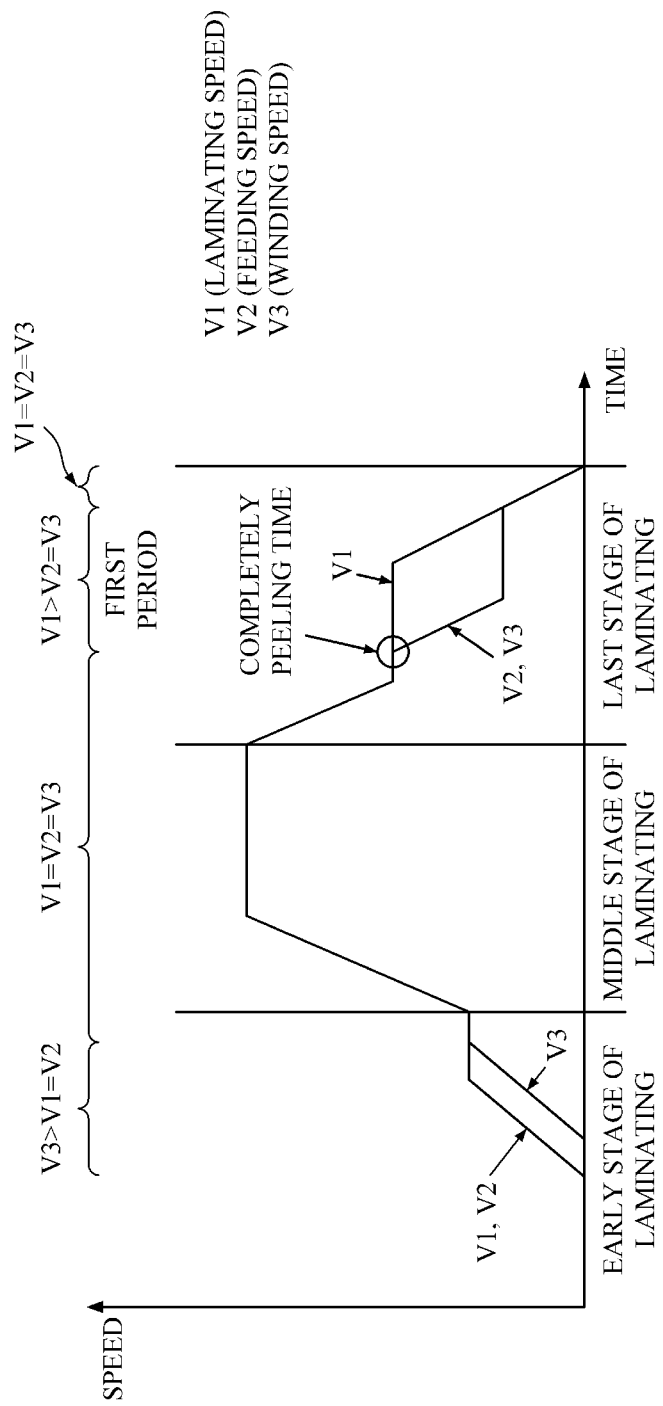
FIG. 5A is a diagram illustrating a condition of the speeds V1, V2, and V3 in the system for manufacturing the optical display device according to the exemplary embodiment of the present invention.

FIG. 5A is a diagram illustrating a condition of the speeds V1, V2, and V3 in the system for manufacturing the optical display device according to the exemplary embodiment of the present invention.

First, in the early stage in which the first sheet piece 13a is laminated on the panel P, it is assumed that the peeling point is positioned between the front end of the peeling unit and the target peeling position.

In this case, after the laminating speed V1 (the transfer speed of the first sheet piece 13a and the panel P) and the feeding speed V2 (the transfer speed of the second sheet piece) are equally accelerated, the winding speed V3 (the transfer speed of the release film from which the sheet piece is peeled) is accelerated to be V3<V1=V2 for a predetermine period, thereby advancing the peeling point toward the target peeling position.

In addition, after the laminating speed V1 (the transfer speed of the first sheet piece 13a and the panel P) and the feeding speed V2 (the transfer speed of the second sheet piece 13b) are maintained at a constant speed, the winding speed V3 (the transfer speed of the first release film 12 from which the sheet piece is peeled) is accelerated up to the same speed as the laminating speed V1 (the transfer speed of the first sheet piece 13a and the panel P) and the feeding speed V2 (the transfer speed of the second sheet piece 13b) maintained at the constant speed to position the peeling point on the target peeling position.

Thereafter, in the middle stage in which the first sheet piece 13a is laminated on the panel P, the laminating speed V1 (the transfer speed of the first sheet piece 13a and the panel P), the feeding speed V2 (the transfer speed of the second sheet piece 13b) and the winding speed V3 (the transfer speed of the first release film 12 from which the sheet piece is peeled) are equally accelerated and then maintained at a constant speed, and thus laminating, feeding, and winding may be rapidly performed.

Thereafter, in the last stage in which the first sheet piece 13a is laminated on the panel P, while the laminating speed V1 (the transfer speed of the first sheet piece 13a and the panel P), the feeding speed V2 (the transfer speed of the second sheet piece 13b) and the winding speed V3 (the transfer speed of the first release film 12 from which the sheet piece is peeled) are equally decelerated and then maintained at a constant speed to be V1>V2=V3 for the first period, and thus the first sheet piece 13a and the second sheet piece 13b may be completely separated from each other. In this case, since V2=V3, the peeling point may be continuously maintained on the target peeling position.

Herein, the start time of the first period may be the complete peeling time and/or a time when the non-laminating length is 10 to 30 mm. In addition, for the first period, the feeding speed V2 (the transfer speed of the second sheet piece 13b) and the winding speed V3 (the transfer speed of the first release film 12 from which the sheet piece is peeled) may be first decelerated and then maintained at the constant speed, the laminating speed V1 (the transfer speed of the first sheet piece 13a and the panel P) is decelerated after the feeding speed V2 (the transfer speed of the second sheet piece 13b) and the winding speed V3 (the transfer speed of the first release film 12 from which the sheet piece is peeled) are decelerated to be decelerated until the feeding speed V2 (the transfer speed of the second sheet piece 13b) and the winding speed V3 (the transfer speed of the first release film 12 from which the sheet piece is peeled) reach the speed maintained at the constant speed.

Thereafter, until the laminating completion time when the first sheet piece 13a is completely laminated on the panel P, while the laminating speed V1 (the transfer speed of the first sheet piece 13a and the panel P), the feeding speed V2 (the transfer speed of the second sheet piece 13b) and the winding speed V3 (the transfer speed of the first release film 12 from which the sheet piece is peeled) are equally decelerated, the peeling point may be continuously maintained on the target peeling position and simultaneously, the first sheet piece 13a may be completely laminated on the panel P in a stable low-speed state.

Figure 5B:
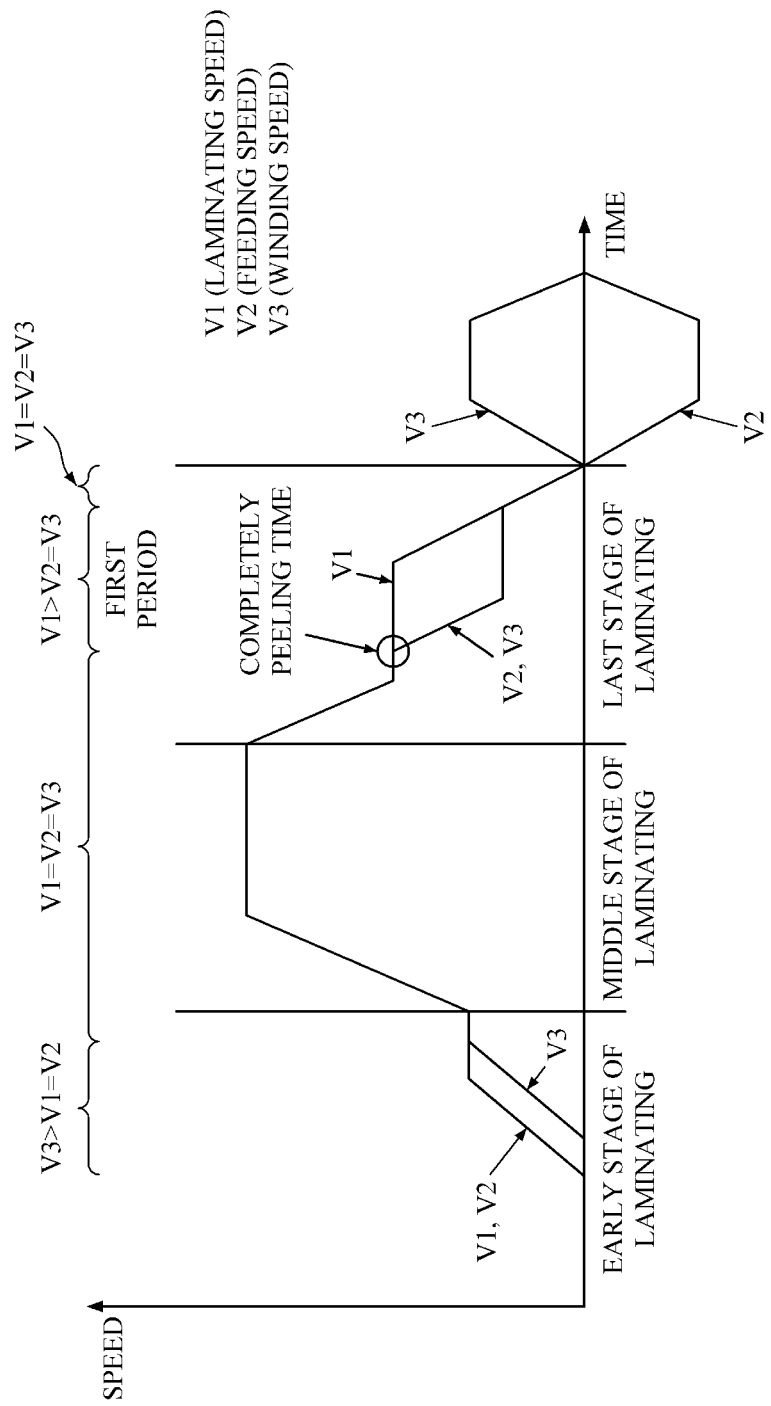
FIG. 5B is a diagram illustrating the condition of the speeds V1, V2, and V3 including a state after the first sheet piece is completely laminated on the panel in the system for manufacturing the optical display device according to the exemplary embodiment of the present invention.

FIG. 5B is a diagram illustrating the condition of the speeds V1, V2, and V3 including a state after the first sheet piece is completely laminated on the panel in the system for manufacturing the optical display device according to the exemplary embodiment of the present invention.

In FIG. 5A, the laminating speed V1 (the transfer speed of the first sheet piece 13a and the panel P), the feeding speed V2 (the transfer speed of the second sheet piece 13b) and the winding speed V3 (the transfer speed of the release film 12 from which the sheet piece is peeled) until the first sheet piece 13a is completely laminated on the panel P are described. Therefore, hereinafter, after the first sheet piece 13a is completely laminated on the panel P, the feeding speed V2 (the transfer speed of the second sheet piece 13b) and the winding speed V3 (the transfer speed of the first release film 12 from which the sheet piece is peeled) while the front end of the second sheet piece 13b is returned to the front end 117a of the first peeling unit 117 will be described.

In FIG. 5, the laminating speed V1 (the transfer speed of the first sheet piece 13a and the panel P), the feeding speed V2 (the transfer speed of the second sheet piece 13b) and the winding speed V3 (the transfer speed of the release film 12 from which the sheet piece is peeled) until the first sheet piece 13a is completely laminated on the panel P are described. Therefore, hereinafter, after the first sheet piece 13a is completely laminated on the panel P, the feeding speed V2 (the transfer speed of the second sheet piece 13b) and the winding speed V3 (the transfer speed of the first release film 12 from which the sheet piece is peeled) while the front end of the second sheet piece 13b is returned to the front end 117a of the first peeling unit 117 will be described.

Even after the completely peeling time when the first sheet piece 13a is completely peeled from the first release film 12, the feeding speed V2 (the transfer speed of the second sheet piece 13b) and the winding speed V3 (the transfer speed of the first release film 12 from which the sheet piece is peeled) are decelerated, but since the speeds are maintained to be greater than 0 until the laminating completion time, the second sheet piece 13b is still peeled from the first release film 12 until the laminating completion time.

Accordingly, after the laminating completion time, it is required to control the second sheet piece 13b to move in a direction spaced apart from the first laminating unit 130 and both the front end of the second sheet piece 13b and the inwardly folded portion of the first release film 12 to be positioned at the front end 117a of the first peeling unit 117. In other words, while the inwardly folded-back portion of the first release film 12 is folded at the front end 117a of the first peeling unit 117, tension may be maintained, and thus the second sheet piece 13b after the first sheet piece 13b is laminated is ready as a subsequent first sheet piece again to be peeled from the first release film 12 before being laminated on a subsequent panel.

In the embodiment, after the laminating completion time, the feeding speed V2 (the transfer speed of the second sheet piece 13b) is accelerated in a state less than 0, maintained at a constant speed, and then decelerated to 0, and the winding speed V3 (the transfer speed of the first release film 12 from which the sheet piece is peeled) is accelerated in a state greater than 0, maintained at a constant speed, and then decelerated to 0. In this case, it is preferred that absolute values of V2 and V3 are equal to each other.

While V2 is smaller than 0 and V3 is larger than 0, while the second sheet piece 13b moves in the direction spaced apart from the first laminating unit 130, the portion peeled from the first release film 12 after the completely peeling time is adhered to the first release film 12 again on the second sheet piece 13b and the inwardly folded-back portion of the first release film 12 also moves toward the front end 117a of the first peeling unit 117. When absolute values of V2 and V3 are equal to each other in the meanwhile, the front end of the second sheet piece 13b and the inwardly folded portion of the first release film 12 may be simultaneously positioned at the front end 117a of the first peeling unit 117.

FIG. 6 is a diagram illustrating a condition of speeds V1, V2, and V3 in a system for manufacturing an optical display device according to a second embodiment of the present invention.

First, in the early stage in which the first sheet piece 13a is laminated on the panel P, it is assumed that the peeling point is positioned between the front end of the peeling unit and the target peeling position.

In this case, after the laminating speed V1 (the transfer speed of the first sheet piece 13a and the panel P) and the feeding speed V2 (the transfer speed of the second sheet piece) are equally accelerated, the winding speed V3 (the transfer speed of the release film from which the sheet piece is peeled) is accelerated to be V3<V1=V2 for a predetermine period, thereby advancing the peeling point toward the target peeling position.

In addition, after the laminating speed V1 (the transfer speed of the first sheet piece 13a and the panel P) and the feeding speed V2 (the transfer speed of the second sheet piece 13b) are maintained at a constant speed, the winding speed V3 (the transfer speed of the first release film 12 from which the sheet piece is peeled) is accelerated up to the same speed as the laminating speed V1 (the transfer speed of the first sheet piece 13a and the panel P) and the feeding speed V2 (the transfer speed of the second sheet piece 13b) maintained at the constant speed to position the peeling point on the target peeling position.

Thereafter, in the middle stage in which the first sheet piece 13a is laminated on the panel P, the laminating speed V1 (the transfer speed of the first sheet piece 13a and the panel P), the feeding speed V2 (the transfer speed of the second sheet piece 13b) and the winding speed V3 (the transfer speed of the first release film 12 from which the sheet piece is peeled) are equally accelerated and then maintain at a constant speed, and thus laminating, feeding, and winding may be rapidly performed.

Thereafter, in the last stage in which the first sheet piece 13a is laminated on the panel P, the laminating speed V1 (the transfer speed of the first sheet piece 13a and the panel P), the feeding speed V2 (the transfer speed of the second sheet piece 13b) and the winding speed V3 (the transfer speed of the first release film 12 from which the sheet piece is peeled) are equally decelerated and then maintained at a constant speed to be V1>V2=V3 for the first period, and thus the first sheet piece 13a and the second sheet piece 13b may be completely separated from each other. In this case, since V2=V3, the peeling point may be continuously maintained on the target peeling position.

Herein, the start time of the first period may be the complete peeling time and/or a time when the non-laminating length is 10 to 30 mm.

In addition, for the first period, the feeding speed V2 (the transfer speed of the second sheet piece 13b) and the winding speed V3 (the transfer speed of the first release film 12 from which the sheet piece is peeled) are first decelerated to be 0 before the first sheet piece 13a is completely laminated on the panel P.

The laminating speed V1 (the transfer speed of the first sheet piece 13a and the panel P) is decelerated after the feeding speed V2 (the transfer speed of the second sheet piece 13b) and the winding speed V3 (the transfer speed of the first release film 12 from which the sheet piece is peeled) are decelerated to be 0 at the laminating completion time when the first sheet piece 13a is completely laminated on the panel P.

Meanwhile, after the first period in which the feeding speed V2 (the transfer speed of the second sheet piece 13b) and the winding speed V3 (the transfer speed of the first release film 12 from which the sheet piece is peeled) are 0, until the laminating completion time when at least the first sheet piece 13a is completely laminated on the panel P, the feeding speed V2 (the transfer speed of the second sheet piece 13b) is accelerated in a state less than 0, maintained at a constant speed, and then decelerated to 0, and the winding speed V3 (the transfer speed of the first release film 12 from which the sheet piece is peeled) is accelerated in a state greater than 0, maintained at a constant speed, and then decelerated to 0. In this case, it is preferred that absolute values of V2 and V3 are equal to each other.

While V2 is smaller than 0 and V3 is larger than 0, while the second sheet piece 13b moves in the direction spaced apart from the first laminating unit 130, the portion peeled from the first release film 12 is adhered to the first release film 12 again on the second sheet piece 13b after the complete peeling time and the inwardly folded portion of the first release film 12 also moves toward the front end 117a of the first peeling unit 117. When absolute values of V2 and V3 are equal to each other in the meanwhile, the front end of the second sheet piece 13b and the inwardly folded portion of the first release film 12 may be simultaneously positioned at the front end 117a of the first peeling unit 117.

Accordingly, until at least the laminating completion time after the first period, the second sheet piece 13b may move in a direction spaced apart from the first laminating unit 130 and both the front end of the second sheet piece 13b and the inwardly folded portion of the first release film 12 may be positioned at the front end 117a of the first peeling unit 117. In other words, while the inwardly folded-back portion of the first release film 12 contacts the front end 117a of the first peeling unit 117, tension may be maintained, and the second sheet piece 13b after the first sheet piece 13b is laminated which is a subsequent first sheet piece again may be ready for being peeled from the first release film 12 before being laminated on a subsequent panel.

According to the system and the method for continuously manufacturing the optical display device of the present invention, the control unit controls at least one of the feeding unit, the winding unit, and the laminating unit so that the peeling point where the sheet piece of the polarization film is peeled from the release film may be formed at the target peeling position spaced apart from the front end of the peeling unit at a predetermined interval in the laminating unit direction, thereby stably peeling the sheet piece of the polarization film from the release film and suppressing a stripe defect from being formed in the optical display device, as compared with a manufacturing system in the related art in which the release film is wound by generating a vibration by friction force between the front of the peeling unit and the release film.

Further, in the system and the method for continuously manufacturing the optical display device of the present invention, the control unit controls at least one of the feeding unit, the winding unit, and the laminating unit, so that a rear part of the first sheet piece and a front part of the second sheet piece connected to each other by adhesion of the adhesive layer are completely separated to be spaced apart from each other between a complete peeling time of completely peeling the first sheet piece positioned downstream in a feeding direction of the first sheet pieces and the second sheet piece of two adjacent polarization films from the release film, and a laminating completion time of completely laminating the first sheet piece, thereby preventing the front end of the second sheet piece from being attached to the rear end of the first sheet piece and the rear end of the panel during the laminating process of the first sheet piece.

The aforementioned description of the present invention is to be exemplified, and it can be understood by those skilled in the art that the technical spirit or required features of the present invention can be easily modified in other detailed forms without changing. Therefore, it should be appreciated that the aforementioned embodiments are all illustrative in all aspects and are not restricted. For example, respective constituent elements described as single types can be distributed and implemented, and similarly, constituent elements described to be distributed can also be implemented in a coupled form.

The scope of the present invention is represented by claims to be described below rather than the detailed description, and it is to be interpreted that the meaning and scope of the claims and all the changes or modified forms derived from the equivalents thereof come within the scope of the present invention.

The invention claimed is:

1. A method for continuously manufacturing an optical display device, the method comprising:
feeding and transferring an optical film, wherein the optical film includes a release film which is extended in a longitudinal direction, and a plurality of sheet pieces of a polarization film which are arranged in the longitudinal direction and includes an adhesive layer, wherein the sheet pieces of the polarization film are adhered to the release film through the adhesive layer so that the sheet pieces of the polarization film are peeled from the release film, wherein the feeding and transferring is conducted by a feeding unit;
peeling the sheet pieces of the polarization film from the release film by folding back inwardly the release film of the optical film fed by the feeding unit, wherein the peeling is conducted by a peeling unit;
winding the release film from which the sheet pieces of the polarization film are peeled by the peeling unit, wherein the winding is conducted by a winding unit;
laminating on a panel the sheet pieces of the polarization film peeled from the release film, while transferring the polarized film on the panel, wherein the laminating is conducted by a laminating unit; and
controlling at least one of the feeding unit, the winding unit, and the laminating unit by a controlling unit such that a peeling point at which the sheet pieces of the polarization film are peeled from the release film, is positioned at a target peeling position, wherein the target peeling position is at a predetermined distance spaced apart from a front end of the peeling unit toward the laminating unit;
wherein a rear end of a first sheet piece of the plurality of sheet pieces and a front end of a second sheet piece of the plurality of sheet pieces, which are connected to each other by adhesion to the adhesive layer are adjacent to each other with a slit line formed there between and separated from each other between completion of the peeling when the first sheet piece is completely peeled from the release film and completion of the laminating when the first sheet piece is completely laminated,
wherein the first sheet piece is positioned downstream in a feeding direction, and
wherein the laminating unit, the feeding unit, and the winding unit are controlled to have V3<V1=V2, wherein V3 is a winding speed of the release film by the winding unit, V1 is a laminating speed of the first sheet piece by the lamination unit, and V2 is a feeding speed of the optical film by the feeding unit.

2. The method of claim 1, wherein the step of controlling at least one of the feeding unit, the winding unit, and the laminating unit, includes a first period V2<V1 between completion of the peeling and completion of the laminating.

3. The method of claim 2, wherein a start time of the first period is a time when a length of not yet laminated portion of the panel is 10 to 30 mm when the first sheet piece is laminated on the panel.

4. The method of claim 2, wherein the feeding unit and the winding unit are controlled so that V2=V3 for the first period.

5. A method for continuously manufacturing an optical display device, the method comprising:
feeding and transferring an optical film, wherein the optical film includes a release film which is extended in a longitudinal direction, and a plurality of sheet pieces of a polarization film which are arranged in the longitudinal direction and includes an adhesive layer, wherein the sheet pieces of the polarization film are adhered to the release film through the adhesive layer so that the sheet pieces of the polarization film are peeled from the release film, wherein the feeding and transferring is conducted by a feeding unit;

peeling the sheet pieces of the polarization film from the release film by folding back inwardly the release film of the optical film fed by the feeding unit, wherein the peeling is conducted by a peeling unit;

winding the release film from which the sheet pieces of the polarization film are peeled by the peeling unit, wherein the winding is conducted by a winding unit;

laminating on a panel the sheet pieces of the polarization film peeled from the release film, while transferring the polarized film on the panel, wherein the laminating is conducted by a laminating unit; and controlling at least one of the feeding unit, the winding unit, and the laminating unit by a controlling unit such that a peeling point at which the sheet pieces of the polarization film are peeled from the release film, is positioned at a target peeling position, wherein the target peeling position is at a predetermined distance spaced apart from a front end of the peeling unit toward the laminating unit;

wherein a rear end of a first sheet piece of the plurality of sheet pieces and a front end of a second sheet piece of the plurality of sheet pieces, which are connected to each other by adhesion to the adhesive layer are adjacent to each other with a slit line formed there between and separated from each other between completion of the peeling when the first sheet piece is completely peeled from the release film and completion of the laminating when the first sheet piece is completely laminated, wherein the first sheet piece is positioned downstream in a feeding direction, and wherein the first sheet piece is positioned downstream in a feeding direction, and wherein in the controlling, the laminating unit, the feeding unit, and the winding unit are controlled to have $V3>V1=V2$, wherein $V3$ is a winding speed of the release film by the winding unit, $V1$ is a laminating speed of the first sheet piece by the lamination unit, and $V2$ is a feeding speed of the optical film by the feeding unit.

6. The method of claim 5, wherein the step of controlling at least one of the feeding unit, the winding unit, and the laminating unit, includes a first period $V2<V1$ between completion of the peeling and completion of the laminating.

7. The method of claim 6, wherein a start time of the first period is a time when a length of not yet laminated portion of the panel is 10 to 30 mm when the first sheet piece is laminated on the panel.

8. The method of claim 6, wherein the feeding unit and the winding unit are controlled so that $V2=V3$ for the first period.

* * * * *